(No Model.) 2 Sheets—Sheet 2.

J. LOHGES.
CORN PLANTER.

No. 257,876. Patented May 16, 1882.

Witnesses:
A. M. Long
A. M. Tanner

Inventor,
John Lohges,
By Paine, Crapton & Ladd,
Attorneys.

UNITED STATES PATENT OFFICE.

JOHN LOHGES, OF DELPHOS, KANSAS, ASSIGNOR, BY MESNE ASSIGNMENTS, OF ONE-HALF TO K. S. EVANS, OF SPRINGFIELD, OHIO.

CORN-PLANTER.

SPECIFICATION forming part of Letters Patent No. 257,876, dated May 16, 1882.

Application filed April 30, 1881. (No model.)

*To all whom it may concern:*

Be it known that I, JOHN LOHGES, a citizen of the United States, residing at Delphos, in the county of Ottawa and State of Kansas, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of corn planters or drills in which a double-mold-board plow located in advance of the planting mechanism serves to make a single furrow and turns the soil on each side of said furrow, so as to leave the latter in condition for the reception of corn or other seeds planted in drills.

The object of the invention is to provide a listing-plow of a simplified form, which runs more easily than any other heretofore known and turns the soil far enough from the furrow to cover the center between the furrows; and another object of the invention is to provide planting devices, adjustable furrow-opening shoe, and subsoil covering-plows, which will make up a plow and planter adapted in every way to operate in a satisfactory and perfect manner.

I attain the above results by the construction and combination of parts hereinafter described and claimed.

Figure 1:
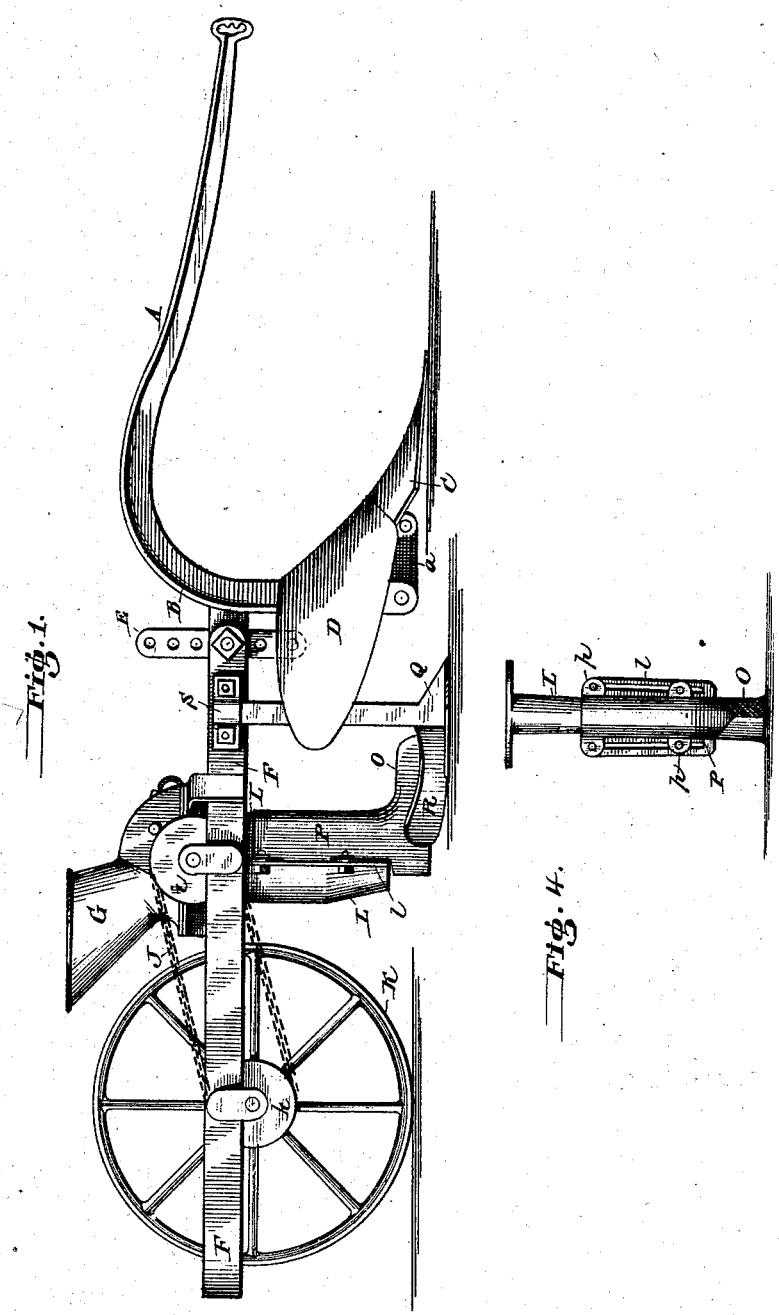
Figure 2:
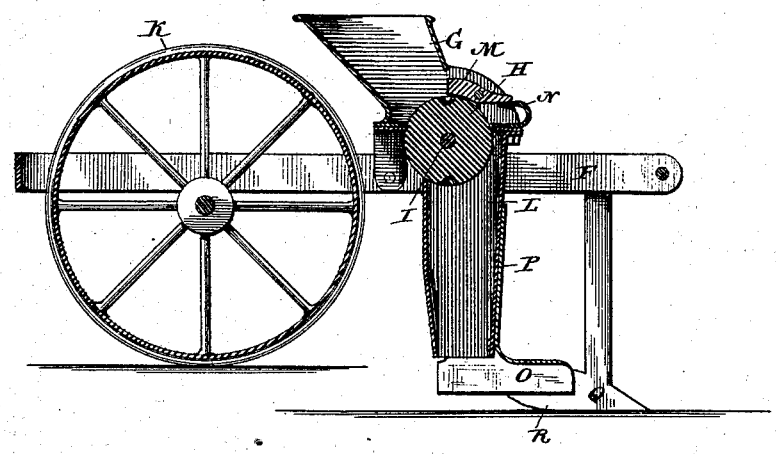
Figure 3:
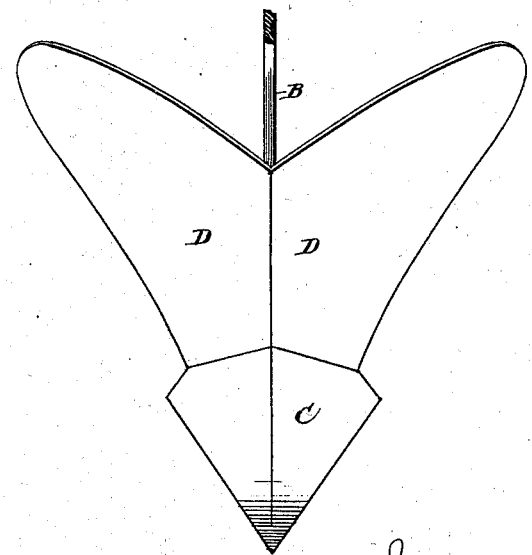

In the drawings, Figure 1 is a side elevation of a combined listing-plow and corn-planter constructed according to my invention. Fig. 2 is a vertical section taken through the planting devices. Fig. 3 is a perspective view of the double-mold-board plow having a single double-edged share. Fig. 4 is a detail view of the seed-spout and furrow-opener.

The letter A designates the beam of the plow, which is preferably made of metal, and has a rear standard, B, formed in one piece therewith. This standard is provided with a bottom shoe or plate, *a*, which serves as a support or rest for the share C, that is joined at its upper edge to the double mold-boards D. The share C is made of plate metal, and is of a triangular shape, or of a form approximating thereto. The two mold-boards are made quite long and narrow, and extend in an outward and rearward direction from the standard B. They are connected with the share by a suitable overlapping plate and rivets or bolts; or they may be secured to the standard in any preferred manner. The point or front portion of the share lies flat upon the ground, and the main portion of said share is elevated above the same. The object of this construction of share and provision of long narrow mold-boards is to enable the plow to pass through the ground in an easy manner, and to cause the soil to be raised and loosened at the bottom of the furrow and turned or thrown on each side of the furrow far enough to cover the center between two furrows, and thus leave the latter in a condition for the free passage of the planting devices. By throwing the soil farther away from the furrow than heretofore permitted, I form a wider furrow, and thus facilitate the planting of the seed and growth and cultivation of the crop. The share, shaped as shown, will also tend to raise and loosen the soil in the bottom of the main furrow, so as to permit the drill for the reception of the seed to be opened with ease and dispatch.

A vertical arm or bracket, E, projecting from the rear of the standard B has a series of holes, and serves for adjustably attaching the planter-frame F to the plow. Said frame comprises two side bars, a rear connecting-bar, and front arms, which are brought together and embrace the bracket E, being connected therewith by a pin or bolt, so as to form a hinge or pivot connection.

A hopper, G, mounted on the frame near the front thereof, contains a disk, H, having a cupped periphery, and fixed on a transverse shaft, I, journaled in brackets on the side bars of the frame. Said shaft has a grooved pulley, *i*, around which passes an endless belt or chain, J, extending from a pulley, *k*, on the shaft of a ground-roller, K. The rotation of said roller by contact with the ground will impart motion to the revolving distributing-disk, causing the cups therein to convey the corn or seed in measured quantities into a discharge or delivering spout, L.

A pivoted cut-off, M, arranged between two angular plates or front extensions of the hopper, is pressed in contact with the cupped distributing-disk by means of a spring, N, arranged under said cut-off.

A shoe, O, for opening the seed-receiving drill or furrow in the bottom of the main furrow, has a leg or standard portion, P, which is made hollow and embraces the spout L. Flanges l, projecting from the sides of said spout, are provided with vertical slots, and bolts passing through ears or flanges p on the leg of the furrow-opener and through said slotted flanges permit the furrow-opener to be raised and lowered, according to the exigencies of the case or the depth of seed furrow or drill required.

A pair of subsoil or soil-loosening plows, Q, are arranged in front of the furrow-opener, at either side of the frame. The object of these plows is to cut in on the side of the furrow and throw the loose soil toward the center of the main furrow, to aid in covering up the corn or seed by the succeeding covering-roller. These plows are bent at an angle at their lower ends, and are provided with inwardly-turned wings R, of a curved shape. These wings project in a rearward direction from the shank or vertical portion of the plows in order to throw the soil in an inward direction, as already stated. Sockets or keepers S on the sides of the frame receive the shanks of the plows, and they are adjustably retained therein by suitable keys or screws. The object of adjusting the plows in a vertical direction is to vary the amount of soil thrown toward the center of the main furrow.

I am aware that a double-mold-board listing-plow, a furrow-opener, and inwardly-turned covering-wings have heretofore been employed in connection with planting or seed-distributing devices of a corn-planter. I make no broad claim to such a combination of parts, and confine myself to a construction and arrangement of devices herein shown.

Having thus described my invention, what I claim as new, and desire to secure by Letters Patent, is—

1. In a combined listing-plow and corn-planter, the combination of the triangular double-edged share having a flat front portion, the long and narrow mold-boards D, the subsoil-plows Q, arranged at the rear of said mold-boards and having inwardly-projecting wings R, the fixed seed-spout L, and vertically-adjustable furrow-opener O P, with the beam A, pivoted frame F, and seed-distributing mechanism, as and for the purpose herein set forth.

2. The plows Q, arranged on each side of frame F, and formed with the wing-shares R, and the vertically-adjustable furrow-opener O, having leg P, formed with ears p, in combination with the flanged seed-spout L, wheel K, chain J, the seed-dropping devices, frame F, and plow C D, substantially as shown and described.

In testimony whereof I affix my signature in presence of two witnesses.

JOHN LOHGES.

Witnesses:
J. W. BAHR,
ISAAC F. TUDOR.